United States Patent [19]

Hirao et al.

[11] Patent Number: 5,674,793
[45] Date of Patent: Oct. 7, 1997

[54] METHOD FOR PRODUCING A HIGH-STRENGTH, HIGH-TOUGHNESS SILICON NITRIDE SINTER

[75] Inventors: Kiyoshi Hirao; Manuel E. Brito, both of Nagoya; Shuzo Kanzaki, Kasugai, all of Japan

[73] Assignee: Agency of Industrial Science and Technology, Ministry of International Trade & Industry, Tokyo, Japan

[21] Appl. No.: 529,854

[22] Filed: Sep. 18, 1995

[30] Foreign Application Priority Data

Sep. 20, 1994 [JP] Japan ................... 6-253095
Dec. 21, 1994 [JP] Japan ................... 6-336177

[51] Int. Cl.$^6$ .............................................. C04B 35/587
[52] U.S. Cl. .............................................. 501/97; 264/56
[58] Field of Search ...................... 501/97; 264/56, 264/65

[56] References Cited

U.S. PATENT DOCUMENTS

| | | | |
|---|---|---|---|
| 4,886,767 | 12/1989 | Goto et al. | 501/97 |
| 5,214,007 | 5/1993 | Ando | 501/97 |
| 5,369,065 | 11/1994 | Yoshimura et al. | 501/97 |
| 5,401,450 | 3/1995 | Mitomo et al. | 501/97 |
| 5,472,919 | 12/1995 | Mitomo et al. | 501/97 |

FOREIGN PATENT DOCUMENTS

8 34670  2/1996  Japan .

OTHER PUBLICATIONS

Kiyoshi Hirao et al., Preparation of Rod–Like β–$Si_3N_4$ Single Crystal Particles; Journal of the Ceramic Society of Japan 101 [9] pp. 1078–1080 (1993) no month.

Kiyoshi Hirao et al., Microstructure Control of Silicon Nitride by Seeding with Rodlike β–Silicon Nitride Particles; Journal of the American Ceramic Society, 77 [7] pp. 1857–62 (1994) no month.

Naoto Hirosaki et al., Effect of Grain Growth of β–Silicon Nitride on Strength, Weibull Modulus, and Fracture Toughness; Journal of the American Ceramic Society, 76 [7] pp. 1892–94 (1993) no month.

Eiji Tani et al., Gas–Pressure Sintering of $Si_3N_4$ with Concurrent Addition of $Al_2O_3$ and 5 WT% Rare Earth Oxide: High Fracture Toughness $Si_3N_4$ with Fiber–Like Structure; Ceramic Bulletin in vol. 65, No. 9 pp. 1311–15 (1986) no month.

Hiroaki Sakai et al., Mechanical Properties of SIC Platelet Reinforced Ceramic Composites; Advanced Composite Materials, vol. 19, pp. 765–71 no month no date.

Peter D. Shalek et al., Hot–Pressed SiC Whisker/$Si_3N_4$ Matrix Composites; Ceramic Bulletin, vol. 65, No. 2, pp. 351–56 (1986) no month.

*Primary Examiner*—Karl Group
*Attorney, Agent, or Firm*—Oblon, Spivak, McClelland, Maier & Neustadt, P.C.

[57] ABSTRACT

A method for the production of a high-strength high-toughness silicon nitride sinter includes the steps of mixing a silicon nitride powder with a sintering additive, adding to the resultant mixture as seed particles 0.1 to 10% by volume, based on the amount of the mixture, of elongated single crystal β-silicon nitride particles having a larger minor diameter than the average particle diameter of the silicon nitride powder and having an aspect ratio of at least 2, forming the resultant mixture so as to orient the elongated single crystal β-silicon nitride particles as seed particles in a specific direction, and heating the green body to density it and simultaneously induce epitaxial growth of single crystal β-silicon nitride particles, and a high-strength, high-toughness silicon nitride sinter obtained by the method.

6 Claims, 2 Drawing Sheets

METHOD FOR PRODUCING A HIGH-STRENGTH, HIGH-TOUGHNESS SILICON NITRIDE SINTER

BACKGROUND OF THE INVENTION

1. Field of the Invention

This invention relates to a silicon nitride sinter exhibiting extremely high strength and toughness in a specific direction and a method for the production thereof.

Silicon nitride exhibits higher covalent bond strength and much better stability at high temperatures than oxide ceramics. This has stimulated research into high-temperature structural materials using silicon nitride. While some practical applications have recently been found for silicon nitride such as in engine parts, including automobile grade turbo chargers, use has been limited because, despite being the toughest among ceramics, silicon nitride has a fracture toughness that is one or more decimal places lower than that of metallic materials.

2. Description of the Prior Art

Various methods aimed at further improving the toughness of silicon nitride ceramics have been studied. Among these, the method of improving toughness by dispersing plate- or column-shaped second phase in the ceramic matrix and consequently producing a bridging or an pull-out effect along cracks occurring in the ceramic matrix proves particularly effective. Various procedures have been developed for implementing this method. These include the method of dispersing whiskers or platelike particles by mechanical agitation and the method of developing coarse columnar grains of $\beta$-silicon nitride in the sinter as by gas pressure sintering.

The former method produces a highly toughened silicon nitride sinter having fracture toughness in the range of from 10 to 14 MPa·m$^{1/2}$. Am. Ceram. Soc. Bull., 65[2] 351–356 (1986), for example, reports formation of a sinter having fracture toughness in the range of from 10 to 12 MPa·m$^{1/2}$ by dispersing 10 to 40% in volume of SiC whiskers in a silicon nitride and subjecting the resultant green body to hot press sintering, and Ceramic Transactions, Vol. 19, pp. 765–771 reports production of a sinter having fracture toughness of 14 MPa·m$^{1/2}$ by dispersing 30% in volume of SiC platelike particles in a silicon nitride and subjecting the resultant green body to a treatment with a hot press. Though the sinters obtained by these procedures have high levels of fracture toughness, they exhibit conspicuously low strength (in the range of from 400 to 600 MPa) because the incorporated reinforcing materials act as flaws. Besides, the dispersion of 10 to 40% in volume of a second phase is expensive because it requires firing by a special method such as hot pressing or hot isostatic pressing (HIP).

The latter method consists in firing in an ambience of nitrogen compressed to about 100 atmospheres at a temperature in the range of from 1800° to 2000° C. thereby developing large elongated $\beta$-silicon nitride grains in the sinter that produce the same effect as whiskers. This method eliminates the need for hot press or HIP and forms a silicon nitride sinter having high fracture toughness in the range of from 8 to 11 MPa·m$^{1/2}$. This is comparable to the toughness obtained by incorporation of whiskers.

Am. Ceram. Soc. Bull., 65[9] 1311–1315 (1986) reports production of a silicon nitride sinter having fracture toughness of about 9 MPa·m$^{1/2}$ by adding alumina-rare earth oxide as a sintering additives to raw material $\alpha$—$Si_3N_4$ and firing the resultant mixture in an ambience of nitrogen compressed to 20 to 40 atmospheres at 2000° C., and J. Am. Ceram. Soc., 76[7] 1892–1894 (1993) reports production of a silicon nitride sinter having fracture toughness in the range of from 8.5 to 10.3 MPa·m$^{1/2}$ by adding $Y_2O_3$—$Nd_2O_3$ as a sintering additives to raw material of $\beta$-$Si_3N_4$ and firing the resultant mixture in an ambience of nitrogen compressed to 100 atmospheres at 2000° C. for 2 to 8 hours. The high-toughness silicon nitride sinters obtained by these gas pressure sintering methods have low strength (in the range of from 400 to 700 MPa) because large elongated $\beta$-silicon nitride grains developing in the sinter act as flaws.

No silicon nitride sinter which combines high strength with high toughness has yet been developed. It is, therefore, a primary object of this invention to provide a silicon nitride sinter combining high strength with high toughness and enabling production thereof by an inexpensive process, and a method for the production thereof.

SUMMARY OF THE INVENTION

Specifically, this invention relates to a method for the production of a high-strength, high-toughness silicon nitride sinter comprising the steps of mixing a silicon nitride powder with a sintering additive, adding to the resultant mixture as seed particles 0.1 to 10% by volume, based on the amount of the mixture, of rod-like single crystal $\beta$-silicon nitride particles having a larger diameter than the average particle diameter of the silicon nitride powder and having an aspect ratio of at least 2, forming the resultant mixture so as to orient the rod-like single crystal $\beta$-silicon nitride particles, added as seed particles in a specific direction, and the green body in heated to density it and induce epitaxial growth from single crystal $\beta$-silicon nitride particles; resulting in the high-strength, high-toughness silicon nitride sinter obtained by this method.

DESCRIPTION OF THE PREFERRED EMBODIMENTS

Figure 1:
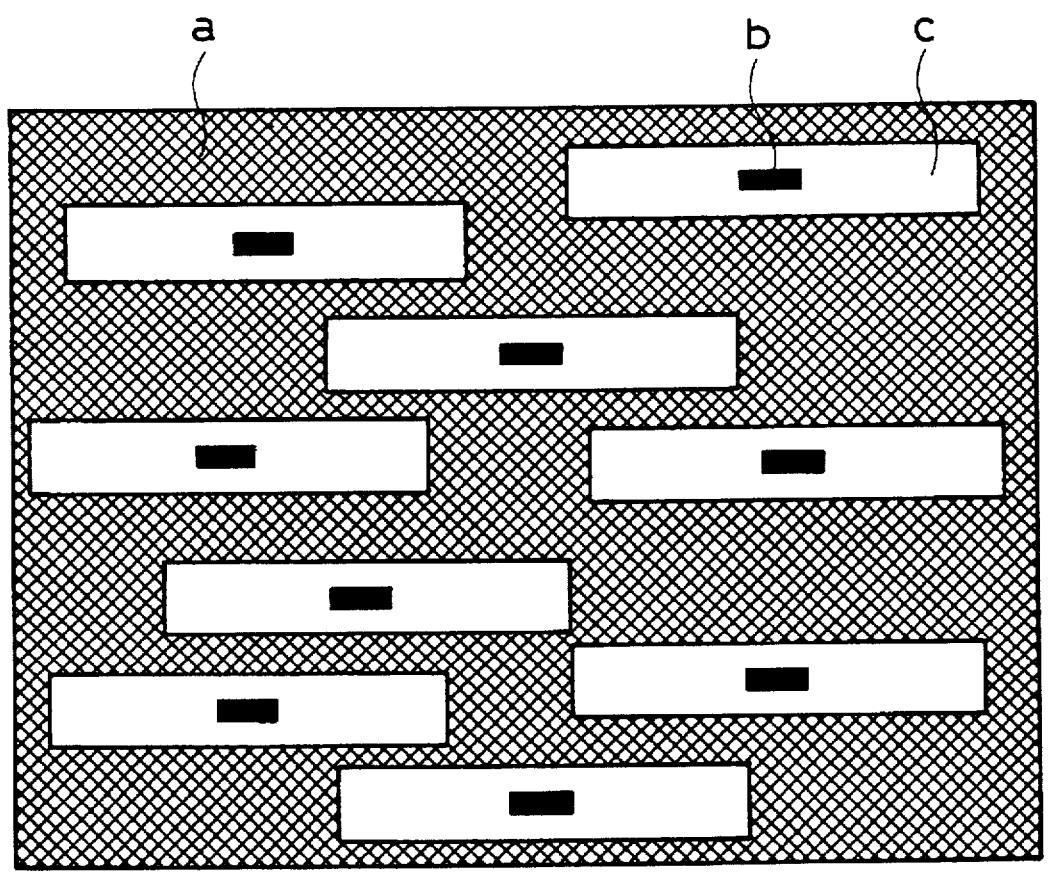
FIG. 1 is a model diagram showing the microstructure of a silicon nitride sinter obtained by this invention.

First, the research that led to this invention will be summarized.

Prior to achieving this invention, the inventors extensively studied the conventional high-toughness silicon nitride sinter obtained by gas pressure sintering for determining the relation between the microstructure, strength, and fracture toughness of the sinter. They found that the conventional gas pressure sintering causes random growth of elongate grains from $\beta$-silicon nitride particles present in the raw material silicon nitride as nuclei and consequently induces occurrence of large elongate grains in the produced sinter. Since the large elongate grains are origin for fracture, the sinter presents low strength, although it has improved fracture toughness.

In cooperation with their colleagues, the inventors prepared seed crystals and produced a sinter by repeating the method disclosed in J. Am. Ceram. Soc., 77[7] 1857–1862 (1994). To be specific, they added rod-like single crystal $\beta$-silicon nitride particles morphological regulated as seed crystals to silicon nitride raw material and tried to control the shape and size of anisotropically grown elongate β-silicon nitride grains. They consequently succeeded in producing a silicon nitride sinter having relatively high strength in the range of from 900 to 1000 MPa and relatively high toughness in the range of from 8.2 to 8.6 MPa·m$^{1/2}$. When the seed crystals were enlarged or the amount of seed crystals added was increased for the purpose of further enhancing the toughness, however, the strength declined to about 700 MPa in spite of improvement of the fracture toughness to a level in the range of from 9 to 10 Mpa·m$^{1/2}$.

The inventors next investigated the microstructure of the sinter with respect to the relation between the strength and toughness thereof and confirmed the following fact.

They made a thorough observation of the microstructure of the system under discussion to find that, in a system retaining high strength and acquiring enhanced toughness, a group of large elongated grains developed from seed crystals were dispersed in a matrix of small grains and, in a system suffering a decline in strength, the group of large elongated grains grown from the seed crystals coalesced. This coalescence was suspected of causing an increase in the flaw size.

Based on this knowledge the inventors continued their study on control of the microstructure by the incorporation of seed crystals. They consequently learned that when the group of large elongated grains present in random three-dimensional orientation are aligned in a specific direction, the toughness of the system is effectively improved in that direction without decrease in strength. Ultimately, they obtained the high-strength, high-toughness silicon nitride sinter of this invention.

This invention will now be described in detail.

To manufacture the high-strength, high-toughness silicon nitride sinter, this invention requires the raw material powder of silicon nitride to be added with a prescribed amount of a sintering additive. The silicon nitride raw material may be in any of such crystal systems as α type, β type, or amorphous type. It is advantageously used in the form of a fine powder having an average particle diameter of not more than 0.5 μm. The sintering additive may be any of the known compounds available for the purpose of accelerating the sintering. Concrete examples are MgO, CaO, Al$_2$O$_3$, Y$_2$O$_3$, Yb$_2$O$_3$, HfO$_2$, Sc$_2$O$_3$, CeO$_2$, ZrO2, SiO$_2$, Cr$_2$O$_3$, and AlN.

The combination of these sintering additives and the amount of sintering additive to be added vary with the method of firing, which may, for example, be normal pressure sintering, gas pressure sintering, hot press, or hot isostatic pressing (HIP). They are so selected that the sample, on being fired by a given method, is compacted to a relative density of not less than 97%. For enabling the silicon nitride to attain anisotropic growth in an elongated shape during sintering, the sintering additive should appropriately contain a rare earth oxide such as Y$_2$O$_3$ or Yb$_2$O$_3$.

The mixing of the raw materials can be conducted using any of the commercially available equipments available for mixing or blending powders. The raw materials are advantageously mixed wet by the use of a suitable solvent such as water, methanol, ethanol, or toluene. In the wet mixing, it is best to use an organic solvent for preventing the otherwise possible oxidation of silicon nitride. In the presence of such an organic solvent, the mixing can be effectively accelerated by using a dispersant such as sorbitan monooleate.

Then, to the slurry obtained as described above, rod-like single crystal β-silicon nitride particles are added as seed crystals in an amount in the range of from 0.1 to 10% by volume, preferably from 1 to 5% by volume. If the amount of the seed crystals so added is less than 0.1% by volume, the group of elongated grains will not be incorporated in a fully satisfactory amount into the sinter. Conversely, if the amount exceeds 10% by volume, the excess of added seed crystals impede the sintering to the extent of preventing the formation of a compact sinter and, though a compact sinter may be attained by pressure sintering such as hot press, the excessive seed crystals will prevent the produced sinter from acquiring high strength because the group of elongated grains grown from the seed particles coalesce and increase the size of flaw. Hence, the amount of the seed crystals added should be limited to the range of from 0.1 to 10% by volume. The shape of the seed crystals is preferably such that the diameter is larger than the average particle diameter of the raw material powder of silicon nitride and the aspect ratio is not less than 2. If the diameter of the seed crystals is smaller than the average particle diameter of the raw material powder, the seed crystals will be dissolved in the transient liquid during sintering and will not accomplish their role of seed crystals. If the aspect ratio is not more than 2, the seed crystals will not be thoroughly oriented as in the case of sheet molding and will induce coalescence between the randomly grown elongated grains and consequently cause the produced sinter to suffer a decrease in strength. The upper limit of the aspect ratio is about 50. If the aspect ratio exceeds 50, the seed crystals will not be thoroughly dispersed.

The elongated single crystal β-silicon nitride particles used as seed crystals may be commercially available β-silicon nitride whiskers. However, since these whiskers lack uniformity of size and contain lattice defects and impurities, it is better to use rod-like single crystal β-silicon nitride particles of high purity and uniform size manufactured by a method such as that reported in Journal of Ceramic Society of Japan, 101[9] 1071–1073 (1993). It is important that the addition of the seed crystals to the raw material powder be implemented by mixing the silicon nitride raw material thoroughly with the sintering additive in accordance with the wet mixing technique mentioned above and causing the seed crystals to be dispersed in the resultant slurry by means of ultrasonic dispersion or by the pot mixing technique using a resin pot and coated resin balls in such a manner as to avoid breaking the seed crystals.

Then, the mixed slurry obtained as described above and a proper amount of an organic binder added thereto are mixed. The produced mixture is sheet molded by the use of a doctor blade or formed by the use of an extrusion device to effect orientation of the seed crystals in the mixture. Particularly when the mixture is sheet molded, the produced sheet are stacked using a hot plate press to acquire a prescribed thickness.

Subsequently, the formed mixture is calcined by the ordinary firing schedule, i.e. at a temperature in the approximate range of from 600° to 1000° C. to remove the binder and then fired in the ambience of nitrogen kept at a temperature in the range of from 1700° to 2000° C. under a pressure of 1 to 200 atmospheres. For the purpose of obtaining a sinter to manifest high strength and high toughness, it is important to sinter to a relative density of not less than 97% and that the elongated β-silicon nitride grains be thoroughly developed from the seed crystals. The silicon nitride sinter obtained from the raw material which incorporates the seed crystals possesses a microstructure in which large elongated β-silicon nitride grains epitaxially grown from the seed crystals are two-dimensionally dispersed in a matrix of small silicon nitride grains. It is important that the group of these large elongated grains account for a volume ratio of not less than 10%. If the volume ratio of the group of elongated grains after the firing is less than 10%, the level of improvement of toughness will be unduly low and the desired sinter will not be obtained. The specific temperature, nitrogen pressure, and keeping time during the firing are closely related to the sintering additive. It is, therefore, necessary to decide the optimum conditions for enabling a given sintering additive to fulfill the requirements mentioned above and for enabling the produced sinter to manifest high strength and high toughness by preliminary testing, for example. This high-toughness silicon nitride sinter is characterized by being compacted by pressureless firing or gas pressure firing. Optionally, the densification may be effected by hot press or HIP.

The silicon nitride sinter produced by the method of this invention as described above possesses such a microstructure that elongated β-silicon nitride grains grown epitaxially from β-silicon nitride particles as seeds are highly dispersed in a planar distribution. Owing to the microstructure of the sinter which has the elongated grains oriented in a planar distribution as described above, this sinter acquires enhanced strength in a direction perpendicular to the direction of the orientation (1) because the whole group of elongated grains function toward enhancing the toughness and consequently the level of improvement of toughness is high as compared with the conventional high-toughness silicon nitride in which the group of elongated grains are present in random three-dimensional orientation and (2) because the large elongated grains, though present in the texture of the sinter, are dispersed in a planar distribution and therefore the extent to which they act as flaw is small.

This invention allows production of a silicon nitride sinter which acquires compaction to a relative density of not less than 99% and exhibiting a strength of not less than 1100 MPa and a fracture toughness of not less than 11 MPa·m$^{1/2}$ in a direction perpendicular to the direction of orientation of the elongated grains.

The microstructure of the silicon nitride sinter obtained by this invention is shown by a model diagram in FIG. 1.

In FIG. 1, the symbol "a" represents a small silicon nitride grains, the symbol "b" an rod-like single crystal β-Ni$_3$N$_4$ particles as a seed crystal, and the symbol "c" elongated grains grown epitaxially from a seed crystal.

The method disclosed by this invention enables production of a silicon nitride sinter exhibiting strength of not less than 1100 MPa and fracture toughness of not less than 11 MPa·m$^{1/2}$ in a direction perpendicular to the direction of orientation of the elongated grains and consequently permits provision of a silicon nitride ceramic simultaneously presenting strength and toughness of a high level unattainable by conventional silicon nitride ceramics.

The silicon nitride sinter of this invention therefore possesses outstanding reliability as compared with conventional silicon nitride sinters and can be expected to find extensive utility as a structural material for heat exchangers, engines, and gas turbine parts in the place of refractory alloys.

The invention will now be described below with reference to working examples and comparative examples.

Example (Production of seed Crystals)

In a planetary mill using balls and a pot both made of silicon nitride, 30 g of a raw material powder of α-Si$_3$N$_4$ having a specific surface area of 2 m$^2$/g and 2.418 g of Y$_2$O$_3$ and 1.288 g of SiO$_2$ added thereto were mixed in methanol as a mixing medium (Composition A). Similarly, 30 g of a raw material of α-Si$_3$N$_4$ having a specific surface area of 5 m$^2$/g and 2.418 g of Y$_2$O$_3$ and 0.322 g of SiO$_2$ added thereto were mixed (Composition B). The compositions A and B were each treated with a vacuum evaporator to vaporize methanol, further vacuum dried at 120° C., and passed through a 60-mesh sieve to obtain a composite for the preparation of seed crystals. The composite was placed in a crucible made of silicon nitride and heated therein in an ambience of nitrogen under 5 atmospheres at 1850° C. for two hours. The aggregate consequently obtained was crushed into a powder of 60 mesh.

The powder obtained as described above was sequentially treated with an aqueous solution of hydrofluoric acid-nitric acid mixture (hydrofluoric acid:nitric acid:water=45:5:50 in volume percentage), sulfuric acid, dilute hydrofluoric acid, and aqua ammonia in the order mentioned to remove Y$_2$O$_3$ and SiO$_2$, glass phase components, and obtain rod-like single crystal β-silicon nitride particles. From Composition A, rod-like single crystal β-silicon nitride particles having a diameter of 1.4 μm and an aspect ratio of 4 (Seed Crystals SA) were obtained. From Composition B, rod-like single crystal β-silicon nitride particles having a diameter of 0.9 μm and an aspect ratio of 10 (Seed Crystals SA) were obtained. These two lots of seed crystals both possessed extremely high purity as evinced by the fact that the oxygen content was not more than 0.26% and the yttrium content was not more than 1.3 ppm.

EXAMPLES 1–5

(Production of sinter of this invention)

In a planetary mill using balls and a pot both made of silicon nitride, a raw material powder of α-Si$_3$N$_4$ (having a specific surface area of 10 m$^2$/g and an average particle diameter of 0.1 μm) and a sintering additive composed of Y$_2$O$_3$ and Al$_2$O$_3$ and 3% by weight of a dispersant [produced by Kao Co., Ltd. and marketed as "Diamine RRT"] based on the total of the other three components added thereto were mixed for three hours in a toluene-butanol liquid mixture (80% by volume of toluene and 20% by volume of butanol) as a mixing medium.

The amount of the mixing medium per 100 g of solids was 110 cc. The amounts (% by weight) of the seed crystals Y$_2$O$_3$ and Al$_2$O$_3$ based on the total amount of solids (α-Si$_3$N$_4$, seed crystals Y$_2$O$_3$ and Al$_2$O$_3$ ) in the working examples were as shown in Table 1.

The slurry obtained in each example and the relevant seed crystals added in an amount of 2 or 5% by weight based on the total amount of solids were mixed for 24 hours by the use of a resin pot and resin-coated balls. Further, the resultant mixture and 9% by weight of a binder (polyvinyl butyral resin) and 2.25% by weight of a plasticizer (dioctyl adipate) based on the total amount of solids which were added thereto were mixed for 48 hours. The slurry consequently obtained was formed by the doctor blade method into a green sheet having a thickness of 150 μm.

When this green sheet was observed under an electron microscope, the seed crystals SA and SB were both found to be oriented in a planar form in the plane of the sheet. The green sheet was cut into rectangles of 45×50 mm and 50 such rectangles were superposed in one direction and laminated at 130° C. under a pressure of 70 kg/cm$^2$. The resultant laminate was calcined in a stream of a mixed gas of 95% N$_2$ and 5% H$_2$ at 600° C. for two hours to remove the organic binder. The calcined sheet was placed in a carbon crucible, covered with a Si$_3$N$_4$ powder, and retained in an ambience of nitrogen compressed to 9 atmospheres at 1850° C. for six hours, to obtain a sinter of this invention.

Figure 2:
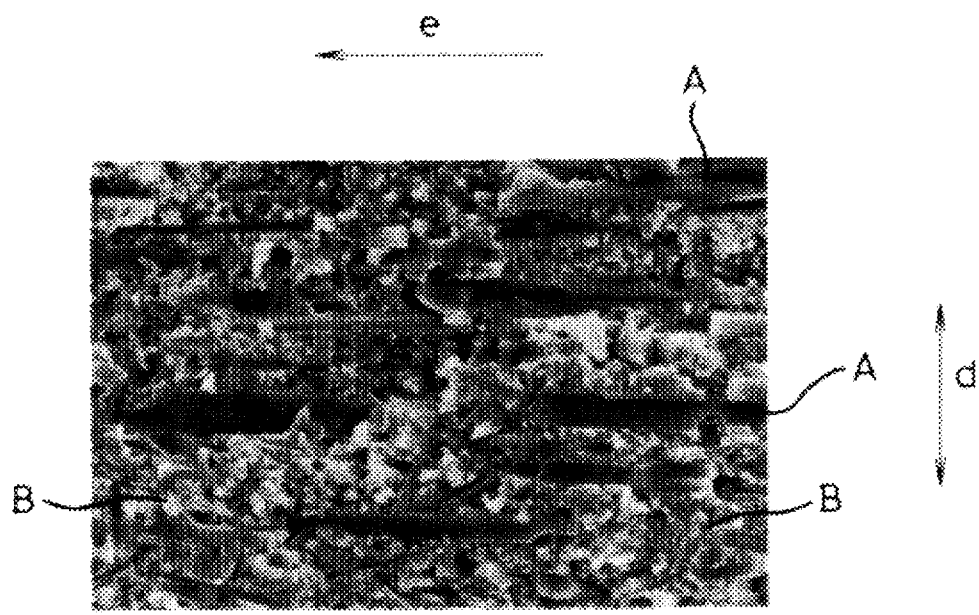
FIG. 2 is an electron micrograph at 2000 magnifications of a fracture surface of the sinter of this invention.
Figure 3:
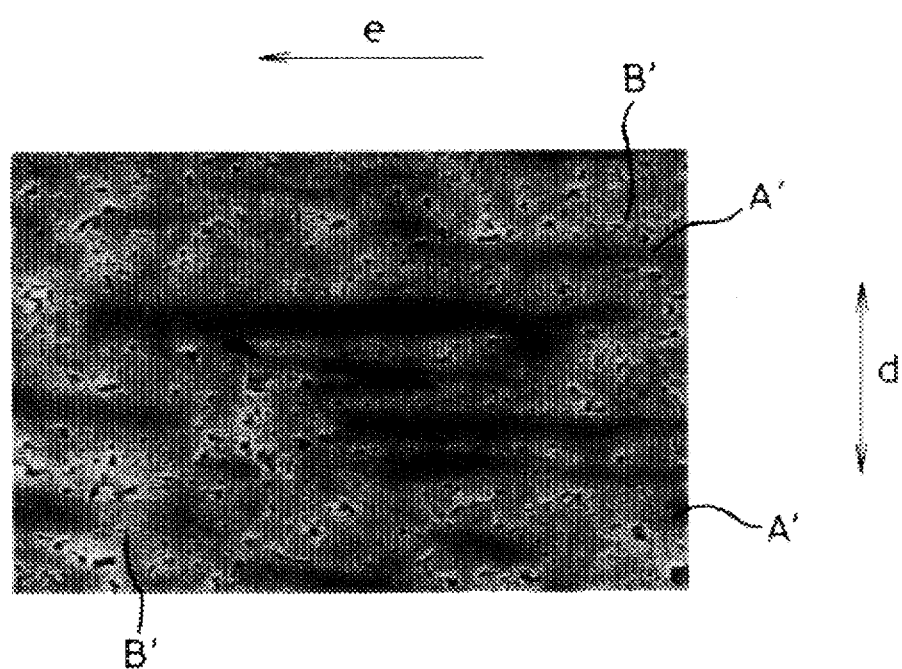
FIG. 3 is an electron micrograph at 2000 magnifications of a ground and etched surface of the sinter of this invention.

The sinter thus obtained was cut into two types test pieces measuring 3×4×40 mm. One type was cut so that the sheet forming direction coincided with the longitudinal direction of the test pieces (A direction) and the other type was cut so that the direction perpendicular to the sheet forming direction coincided with the longitudinal direction of test pieces (B direction). After polishing, the test pieces were tested for specific gravity, for room temperature four-point bending strength as specified by JIS (Japanese Industrial Standards) R-1601, and for fracture toughness by the SEPB method specified by JIS R-1607. A sample was mirror ground and then etched by immersion in an equimolar mixed solution of NaOH and KOH at 280° C. for 15 minutes. In the etched surface of the sample, the ratio of surface area of the group of large elongated grains grown from seed crystals was measured. The results of these tests are shown in Table 1. The electron micrograph (2000 magnifications) of a fractures surface of the sinter mentioned above is shown in FIG. 2 and the electron micrograph (2000 magnifications) of a ground and etched plane of the same sinter is shown in FIG. 3. In the photographs, the symbol "d" represents the direction of sheet lamination and the symbol "e" the direction of sheet formation. The density in Table 1 represents the relative density (%) based on the relevant theoretical density. In FIG. 2, the symbol "A" represents a large elongated grain (grown from a seed crystal) and the symbol "B" a matrix of small silicon nitride grains. In FIG. 3, the symbol "A'" represents an elongated grain and the symbol "B'" a matrix of small silicon nitride grains. The photographs show that the elongated grains had a prefered orientation.

The doctor blade method, JIS R-1601, and JIS R-1607 mentioned above will now be explained.

Doctor blade method: A slurry is prepared by dissolving an organic binder in a solvent and dispersing a given ceramic raw material in the resultant solution. The slurry is spread thin on a carrier film by the use of a blade. The spread layer of the slurry is dried to remove the solvent and obtain a molded sheet having the ceramic raw material powder fixed by the organic binder.

JIS R-1601 (Four-point bending strength measurement): A test piece is placed on two supporting points (lower supporting points) separated by a prescribed distance and a load is applied as split between two points (upper load points) of the test piece separated by equal distances in opposite directions from the center thereof between the supporting points to find the maximum bending stress at the time the test piece fractures. According to JIS R-1601, the distance between the lower supporting points (outer span) is 30 mm, the distance between the upper loading point (inner span) is 10 mm, and the total length, width, and thickness of the test pieces are respectively not less than 36 mm, 4.0±0.1 mm, and 3.0 ±0.1 mm.

JIS R-1607 (SEPB method, single-edge-precracked-beam method): The fracture load of a test piece is determined by precracking the test piece and subjecting this test piece to a three-point bending fracture test. The magnitude of fracture toughness of the test piece is determined based on the precrack length, the size of the test piece, and the distance between the bending supporting points. According to JIS R-1607, the distance between the supporting points is 16 or 30 mm, the width of the test piece is 4.0±0.1 mm, the thickness of the test piece is 3.0±0.1 mm, and the precrack length is 1.2 to 2.4 mm in the three-point fracture test.

COMPARATIVE EXAMPLE 1

In a planetary mill using balls and a pot both made of silicon nitride, a raw material powder of $\alpha$-$Si_3N_4$ and a sintering additive composed of $Y_2O_3$ and $Al_2O_3$ and 0.5% by weight of a dispersant (produced by Lion Chemicals Ltd., Japan and marketed as "Reogard GP") based on the total of the other three components added thereto were mixed in methanol as a mixing medium for three hours. The raw material used was the same as in Example. The composition of the components used was as shown in Table 1. The resultant mixture was dried with a vacuum evaporator to vaporize methanol. The dry residue was calcined in a stream of a mixed gas of 95% $N_2$ and 5% $H_2$ at 600° C. for two hours to remove the organic components. The resultant mixed powder was preformed in the shape of a rectangular cube 42×47×5 mm by the use of a metal mold and further subjected to CIP forming (cold isostatic pressing) under a pressure of 500 MPa. The shaped solid thus manufactured was fired under the same conditions as in Example. The produced sinter was rated in the same manner as in Example. The results are shown in Table 1.

COMPARATIVE EXAMPLES 2–5

In a planetary mill using balls and a pot both made of silicon nitride, a raw material powder of $\alpha$-$Si_3N_4$ and a sintering additive composed of $Y_2O_3$ and $Al_2O_3$ and 0.5% by weight of a dispersant (produced by Lion Chemicals Ltd., Japan and marketed as "Reogard GP") based on the total of the other three components added thereto were mixed in methanol as a mixing medium for three hours. The resultant slurry and a prescribed amount of seed crystals added thereto were mixed for 24 hours by the use of a resin pot and resin-coated balls. The raw materials used herein were the same as in Example and the composition of the components was as shown in Table 1. The resultant mixture was dried to vaporize methanol, treated for removal of the organic components, and then molded and fired by following the procedure of Comparative Example 1. The sinter consequently obtained was rated in the same manner as in Example. The results are shown in Table 1.

TABLE 1

|  |  |  | Seed crystals | | Density (%) | Strength (MPa) | Fracture toughness (MPa·m$^{1/2}$) | Elongated grains | |
|---|---|---|---|---|---|---|---|---|---|
| | Molding method | Sintering additive | Kind | Amount added (% by weight) | | | | Ratio of surface area | Property of orientation |
| Comparative Experiment 1 | Metal mold Press | 5 wt % $Y_2O_3$, 2 wt % $Al_2O_3$ | | None | 99.3 | 1000 | 6.6 | None | |
| Comparative Experiment 2 | " | " | SA | 2 | 99.2 | 890 | 8.7 | 31 | None |
| Comparative Experiment 3 | " | " | " | 5 | 98.3 | 780 | 8.8 | 39 | None |

TABLE 1-continued

|  | Molding method | Sintering additive | Seed crystals | | Properties of sinter | | | Elongated grains | |
|---|---|---|---|---|---|---|---|---|---|
|  |  |  | Kind | Amount added (% by weight) | Density (%) | Strength (MPa) | Fracture toughness (MPa·m$^{1/2}$) | Ratio of surface area | Property of orientation |
| Comparative Experiment 4 | " | " | SB | 2 | 99.0 | 890 | 7.9 | 21 | None |
| Comparative Experiment 5 | " | " | " | 5 | 97.5 | 760 | 8.7 | 30 | None |
| Example 1 | Sheet Sekisou | 5 wt % Y$_2$O$_3$, 2 wt % Al$_2$O$_3$ | SA | 2 | 99.3 | 1150 *1151 | 11.5 *11.0 | 32 | Exist |
| Example 2 | " | " | " | 5 | 99.1 | 1130 | 12.0 | 42 | Exist |
| Example 3 | " | " | SB | 2 | 99.3 | 1200 *1150 | 11.0 *11.0 | 23 | Exist |
| Example 4 | " | " | " | 5 | 99.2 | 1140 | 11.5 | 33 | Exist |
| Example 5 | " | 6 wt % Y$_2$O$_3$, 2 wt % Al$_2$O$_3$ | " | " | 99.3 | 1150 | 11.7 | 32 | Exist |

Note:
In the columns titled "strength" and "toughness", the unmarked numerical values represent data obtained of samples cut in the A direction and the asterisked (*) numerical values represent data obtained of samples cut in the B direction.

Table 1 shows that the sinters obtained in working examples of this invention exhibited outstanding properties as compared with the sinters obtained in Comparative Examples as is evident from the fact that their strengths were not less than 1100 MPa and their fracture toughnesses were not less than 11 MPa·m$^{1/2}$.

What is claimed is:

1. A method for the production of a body of sintered silicon nitride, comprising:

mixing powdered silicon nitride with a sintering additive in a solvent, thereby forming a slurry;

mixing into the slurry, elongated, single crystal β-Si$_3$N$_4$ seed particles, which have a larger diameter than the average particle diameter of said powdered Si$_3$N$_4$ and having an aspect ratio of at least 2, in an amount of 0.1 to 5% by volume based on the total amount of said powdered Si$_3$N$_4$ and said sintering additive, thereby forming a fine dispersion of the seed particles in the slurry;

molding the slurry containing seed silicon nitride particles into a green body, which process orients the seed silicon nitride particles in a specific direction; and heating the green body to densify it and to simultaneously induce epitaxial growth of said single crystal β-Si$_3$N$_4$ grains, thereby forming a strong and tough sintered silicon nitride body.

2. The method according to claim 1, wherein the maximum average particle diameter of said silicon nitride powder is 0.5 μm.

3. The method according to claim 1, wherein said sintering additive is at least one member selected from the group consisting of MgO, CaO, Al$_2$O$_3$, Y$_2$O$_3$, Yb$_2$O$_3$, HfO$_2$, Sc$_2$O$_3$, CeO$_2$, ZrO$_2$, SiO$_2$, Cr$_2$O$_3$, and AlN.

4. The method according to claim 3, wherein said sintering additive is a rare earth element oxide.

5. The method according to claim 1, wherein the maximum aspect ratio of said elongated single crystal β-silicon nitride particles is 50.

6. The method according to claim 1, wherein the molding step is a sheet molding step.

* * * * *